(12) United States Patent
King

(10) Patent No.: US 6,580,857 B1
(45) Date of Patent: Jun. 17, 2003

(54) APPARATUS FOR RESHAPING OPTICAL PULSES

(75) Inventor: Jonathan King, Epping (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/553,135

(22) Filed: Apr. 19, 2000

(51) Int. Cl.[7] .............................. G02B 6/26
(52) U.S. Cl. .............................. 385/39; 385/27
(58) Field of Search .............................. 385/27, 39, 41, 385/42, 46

(56) References Cited

U.S. PATENT DOCUMENTS

| | | | | |
|---|---|---|---|---|
| 4,092,059 A | * | 5/1978 | Hawkes et al. | 359/154 |
| 4,330,170 A | * | 5/1982 | Johnson et al. | 385/43 |
| 5,717,797 A | | 2/1998 | Evans | 385/27 |
| 5,757,529 A | | 5/1998 | Desurvire | 359/179 |

* cited by examiner

*Primary Examiner*—John D. Lee
*Assistant Examiner*—Sarah U Song
(74) *Attorney, Agent, or Firm*—Barnes & Thornburg

(57) ABSTRACT

An apparatus for reshaping optical pulses comprises an N×N optical coupler having N ports on each side of the coupler, where $N \leq 3$. An input and an output of the apparatus are defined by two of the N ports on one side of the optical coupler, and a length of optical fibre connects two of the N ports on the other side of the optical coupler. The function of transmission versus input power has a negative gradient at the power level of the optical pulses. By virtue of phase shifts within the coupler, the transmission function is selected such that higher power pulses are attenuated more than lower power pulses, which tends to even out pulse powers to a constant level. This helps maintain a constant signal to noise ratio within a system and can extend the number of optical spans of an optical signal before it requires full electrical regeneration.

8 Claims, 3 Drawing Sheets

APPARATUS FOR RESHAPING OPTICAL PULSES

FIELD OF THE INVENTION

This invention relates to the field of optical fibre telecommunications, and more particularly to telecommunications over long distances. The invention is particularly concerned with optical communication systems using return-to-zero (R-Z) pulses, and the problems associated with distortion in the pulse shapes over long distances.

BACKGROUND OF THE INVENTION

It is Known that a "soliton" type signal can be propagated along a dispersive fibre without significant chromatic dispersion, because the dependence of the refractive index on the intensity of the signal is able to oppose chromatic dispersion. Thus, the spectral form of the signal is preserved over distance.

There are, however, numerous other distortions which arise during the transmission of optical pulses, especially when they are not exact solitons. These can lead to timing jitter or amplitude noise.

It has been recognised that it is desirable to constrain timing jitter and amplitude noise without the need for full signal regeneration so that the distance between regenerators can be increased. One known approach for improving timing control involves the use of a synchronous modulator which truncates the rise and fall edges of the optical pulses. Appropriate control of a modulator in this way can also reduce amplitude noise at the same time. For example, a pulse having increased amplitude as a result of amplitude noise will, after passage through the timing control modulator, have larger bandwidth than pulses of lower amplitude. Optical filtering gives rise to increased loss of higher bandwidth signals, thereby bringing down the amplitude. Thus, it has been appreciated that the use of timing control may combine with the non-linear characteristics of the optical fibre and optical filtering in such a way that the optical pulses tend towards a uniform amplitude. Optical filtering elements may be used to achieve the desired filter characteristics.

A problem with this approach is that it places constraints upon the fibre dispersion characteristics, the span lengths and the power budgets for the signals. All of these considerations need to be taken into account to enable a system to be designed which achieves the desired control of the pulse shape. This approach is not suitable for low power systems, such as WDM optical transmission systems.

SUMMARY OF THE INVENTION

According to the invention, there is provided an apparatus for reshaping optical pulses comprising an N×N optical coupler having N ports on each side of the coupler, where N is equal to or greater than 3, wherein an input and an output of the apparatus are defined by two of the N ports on one side of the optical coupler, and a length of optical fibre connects two of the N ports on the other side of the optical coupler, and wherein the input and output ports are selected such that the function of transmission versus input power has a negative gradient at the power level of the optical pulses.

The invention essentially provides an optical loop mirror, using a coupler having more than two input and output ports. By virtue of phase shifts within the coupler, the transmission function can be selected such that higher power pulses are attenuated more than lower power pulses, which tends to even out pulse powers to a constant level. This helps maintain a constant signal to noise ratio within the system and can extend the number of optical spans of an optical signal before it requires full electrical regeneration.

The reshaping apparatus is effectively implementing a non-linear transfer function which attenuates optical pulses according to their power.

Preferably, the function of transmission versus input power decreases from a first transmission value at substantially zero input power to a minimum transmission value at a second input power, and the optical pulses have power in the range from zero to the second input power level.

The apparatus for reshaping optical pulses of the invention is a passive optical component which does not require accurate timing control in dependence upon the arrival of the optical pulses. The apparatus can therefore be implemented at low cost.

Preferably, a device is provided in the length of optical fibre to introduce asymmetry, for example an optical amplifier or optical attenuator.

To achieve the desired optical transmission function, the optical coupler may comprise a 3×3 optical coupler, and the ports on the one side then comprise two outer ports and a middle port, and the ports on the other side comprise two outer ports and a middle port, and wherein the input port comprises one of the outer ports on the one side, the output port comprises the other of the outer ports on the one side, and the length of optical fibre connects the two outer ports on the other side of the optical coupler.

The invention also provides an optical regeneration unit for reshaping optical pulses, including an apparatus for reshaping optical pulses of the invention. The invention also provides a multi-channel optical transmission system comprising a transmitter and a receiver and at least one optical regeneration stage, the optical regeneration stage comprising an optical demultiplexer for receiving a multi channel signal and for dividing the signal into the individual channels, at least one optical regeneration unit of the invention.

BRIEF DESCRIPTION OF THE DRAWINGS

Examples of the present invention will now be described in detail with reference to the accompanying drawings in which.

DETAILED DESCRIPTION

Figure 1:
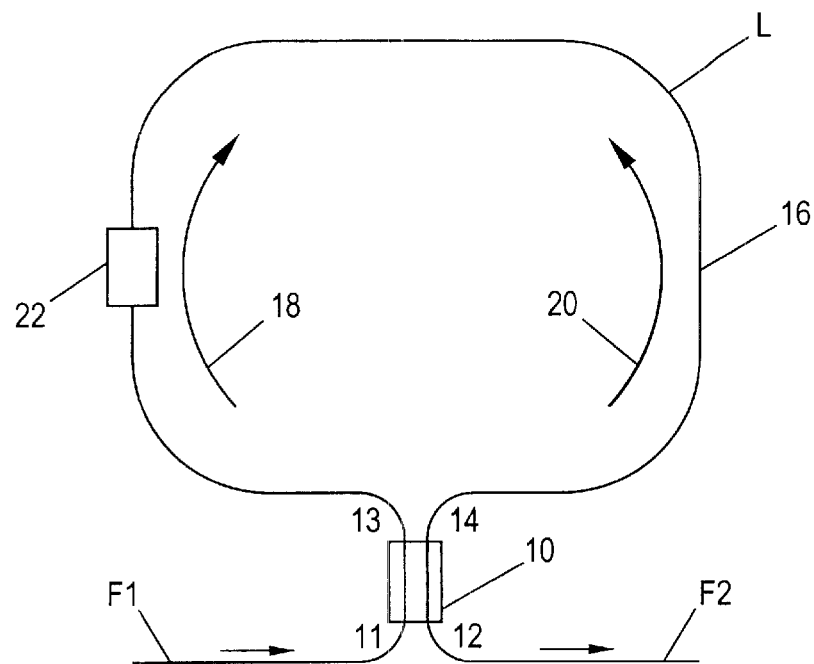
FIG. 1 shows a conventional non-linear optical loop mirror (NOLM) using a 2×2 optical coupler.

Non-linear optical loop mirrors (NOLMs) as well as non-linear amplifying loop mirrors (NALMs) are widely used in the switching, shaping and other processing of optical pulses. FIG. 1 shows a conventional optical loop mirror having an input fibre F1 and an output fibre F2 which are coupled to ports 11, 12 on one side of a 2×2 optical coupler 10. The two ports 13, 14 at the other side of the optical coupler 10 are coupled together by a length of optical fibre 16.

The coupler 10 divides input pulses from the input fibre F1 into two component pulses which propagate around the loop L defined by the fibre 16 in opposite directions. Thus, the input pulses are divided into a clockwise component 18 and an anticlockwise component 20.

If the coupler 10 divides an input pulse into two equal components, and if the loop affects these component pulses symmetrically, then the NOLM will function as a mirror. This is explained further below.

The input signal on the input fibre F1 is divided equally by the coupler 10 to the two output ports 13, 14. However, pulses which pass between adjacent fibres within the coupler 10 undergo a phase shift of 90°. The two signals propagate in opposite directions around the loop L, which has a typical length of between 5 kilometres and 10 kilometres. The signals arrive back at the ports 13, 14 simultaneously, where they interfere with each other. The signal arriving at port 14 undergoes a further phase shift of 90° when it is coupled to the fibre between ports 11 and 13. The signal returning to port 11 is derived from components which have undergone the same phase shift. Consequently, these signals interfere constructively. However, the signal passing from port 13 to port 12 undergoes a further 90° phase shift so that the signal at port 12 is derived from two components with a 180° relative phase shift. These components therefore interfere destructively so that the signal is not transmitted to the output fibre F2. The NOLM therefore functions as a reflecting device.

An input pulse train can of course be represented as a combination of sinusoidal components of different frequency. The concept of constructive and destructive interference can be more readily understood in relation to these components.

If the loop affects the component pulses passing clockwise and anticlockwise differently, the pulses may interfere in a different manner, so that the NOLM can be controlled to reflect or transmit pulses. Asymmetric NOLMs have been used widely for various signal processing functions.

One way to provide this asymmetry within the loop L is to provide an attenuator 22 within the loop, offset from the mid point of the loop. Light passing in one direction around the fibre loop undergoes a larger non-linear phase shift than in the other direction, so that a net phase change results which is dependent on the optical input power. This allows a non-linear power transfer function to be realised. There are other approaches for introducing asymmetry into the loop. For example, the input pulse may be coupled into the loop using a coupler which does not have equal power coupling. Alternatively, an optical amplifier may be positioned asymmetrically instead of the optical attenuator 22 shown in FIG. 1.

A further alternative way of introducing asymmetry to the loop is to inject a control signal into the loop, using a further optical coupler, for example at the location of the attenuator 22 shown in FIG. 1. This control signal propagates one way, for example clockwise, around the loop. The signal waves that are flowing in the opposite direction around the loop are unaffected, whereas the signal waves that are propagating in the same direction around the loop are disturbed. The fibre of the loop L thus exhibits a non-linear effect which changes the refractive index of the fibre as a function of the optical power. The different effective refractive indices result in different propagation speeds which therefore changes the interference of the waves once they return to the coupler 10. The use of a control signal to create asymmetry in the loop enables the asymmetry to be switchable, so that a switchable routing device may be implemented.

Figure 2:
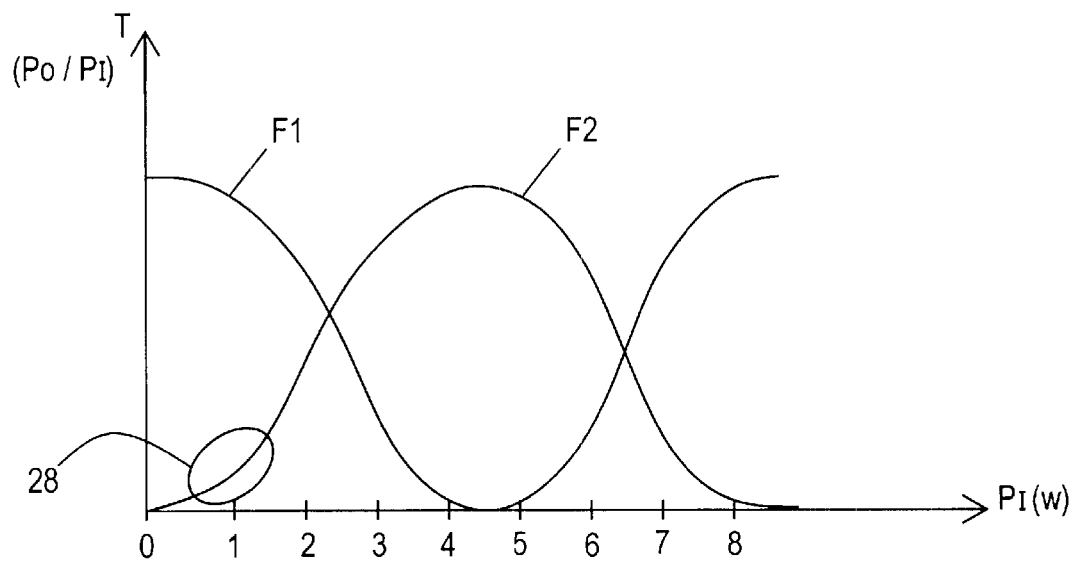
FIG. 2 shows the transmission of the NOLM of FIG. 1 as a function of the input power.

FIG. 2 shows the transmission characteristic (the ratio of output power to input power) of an asymmetric NOLM, as a function of the input power $P_r$. At zero input power (which is of course purely theoretical) the asymmetry of the loop is not effective, since this asymmetry is power-dependent. The curve labelled F1 indicates the transmission ratio for a signal recovered from the input fibre F1, and the plot F2 represents the transmission ratio for a signal recovered from the output fibre F2. It is possible for the input fibre F1 to act also as the output, for example by using a branching unit which taps signals off arriving in one direction. For the theoretical case of zero input power, a maximum power signal is returned to the input fibre F1, and a zero power signal is transmitted to the output fibre F2. This corresponds to the situation described above for a symmetric optical loop mirror.

As shown in FIG. 2, the transmission ratio varies sinusoidally as a function of the input power of the optical pulses provided to the input fibre F1.

A typical power level for an input pulse stream within a WDM system is 1 Watt. Consequently, the transmission characteristic for the output fibre F2 comprises a portion of the sinusoidal curve having a positive gradient. This portion is identified as 28. The attenuation of the device is therefore greater for low power inputs than for high power inputs. The effect of this device on the amplitude of the incoming pulse stream is to attenuate low power pulses more than high power pulses. This increases amplitude fluctuations in the output pulse stream.

Figure 3:
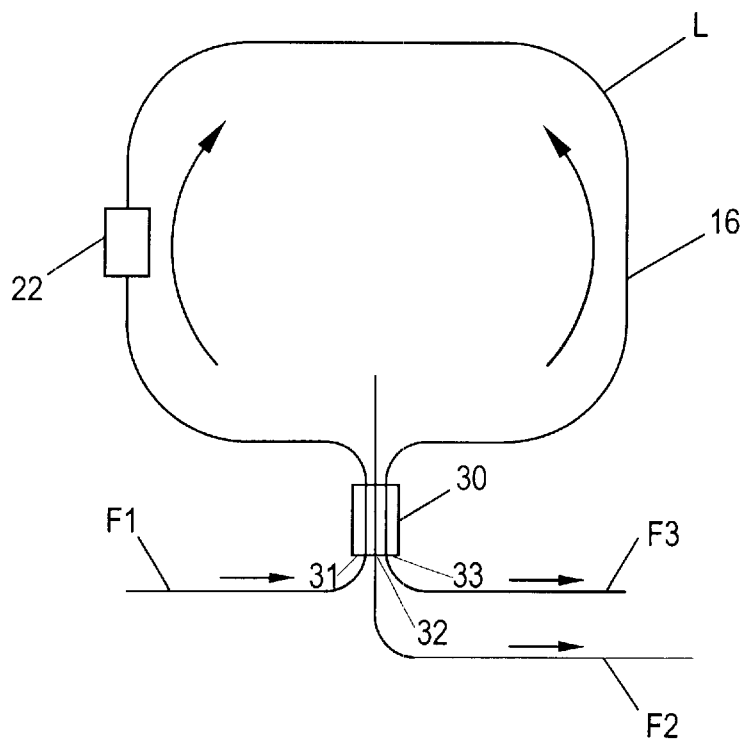
FIG. 3 shows an apparatus for reshaping optical pulses according to the invention.

FIG. 3 shows an apparatus for reshaping optical pulses according to the invention. The apparatus comprises a 3×3 optical coupler 30 having three ports on each side of the coupler. An input fibre F1 and an output fibre F3 are coupled to the outermost ports 31, 33 on one side of the fibre. The middle port 32 on that side of the fibre provides an alternative output F2. On the other side of the coupler 30, a length of optical fibre 16 defines a loop L which connects the outermost two of those three ports. Again, a device 22 is provided to generate asymmetry within the loop L. With a 3×3 optical coupler, a phase shift of 60° exists between adjacent ports. Thus, a signal between the input F1 and the output F3 which passes clockwise around the loop undergoes no phase shift, whereas a signal which passes anticlockwise undergoes 240° of phase shift (120° in one direction through the coupler and a further 120° in the opposite direction through the coupler 30). There is therefore no longer destructive interference for the signal at the output fibre F3 even for a symmetric loop.

The signal reflected by the coupler 30 back to the input fibre F1 is derived from the anticlockwise and clockwise components which have each undergone a 120° phase shift. For a symmetric loop, there is therefore still constructive interference for the signal reflected by the coupler 30.

The middle port 32 of the coupler 30 provides an alternative output along fibre F2. The signal transmitted to fibre F2 comprises the interference of the clockwise component which has undergone a phase shift of 60°, and an anticlockwise component which has undergone a phase shift of 180°.

Figure 4:
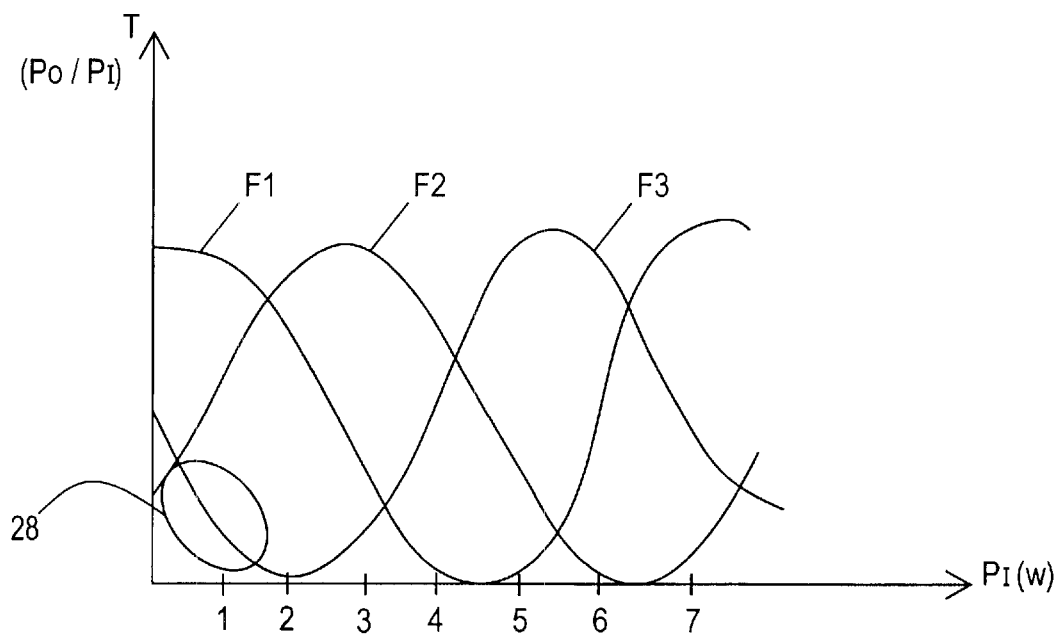
FIG. 4 shows the transmission of the apparatus of FIG. 3 as a function of the input power.

FIG. 4 shows the effect this has on the transmission characteristic of the optical loop mirror.

Again, plot F1 shows the transmission characteristic of the reflected signal, plot F3 shows the transmission characteristic of the signal transmitted to the output fibre F3 and plot F2 shows the power transmission to the alternative output on fibre F2.

FIG. 4 shows that the transmission to the output fibre F3 has a negative gradient at the power level of the optical pulses. Therefore, higher power pulses are attenuated more than lower power pulses, which tends to even out pulse powers to a constant level. This helps maintain a constant signal to noise ratio within the system.

The apparatus of the invention enables different non-linear power transfer characteristics to be obtained with simple and cost effective apparatus. The phase shifts within the coupler 30 enable a bias to be implemented along the non-linear power transmission curve. The apparatus of the invention enables a lower input power to be provided to generate the required negative gradient transmission characteristic.

The invention enables the fiber length times power requirement to be reduced, which is one problem encountered in the manufacture of NOLMs using 2×2 optical couplers.

Figure 5:
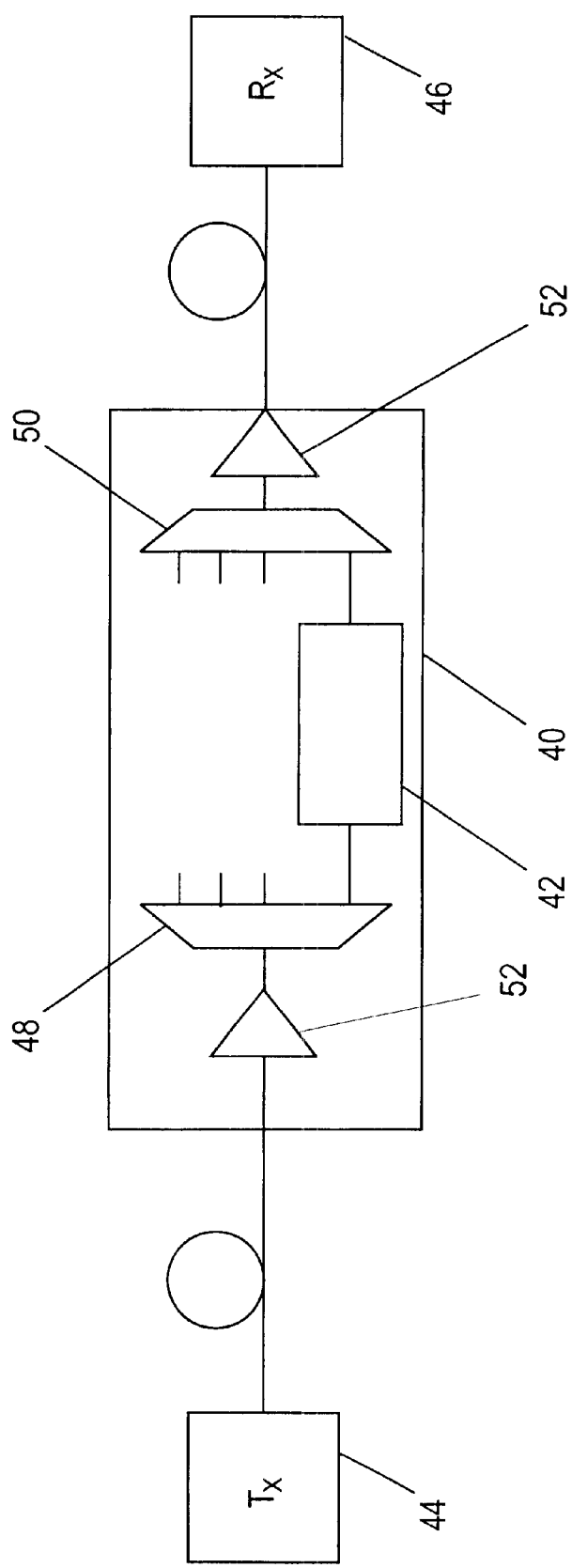
FIG. 5 shows a multi-channel optical transmission system using the apparatus of FIG. 3.

An apparatus having this transmission characteristic may be used within optical regeneration circuitry, and FIG. 5 shows an optical regeneration unit 40 including an apparatus 42 for reshaping optical pulses as shown in FIG. 3. One such apparatus 42 may be provided for each channel within a multi-channel optical transmission system. FIG. 5 shows such a system, which includes a transmitter 44 and a receiver 46 and an intermediate regeneration unit 40. The regeneration unit 40 includes an optical demultiplexer 48 for dividing the incoming multiplexed signal into the individual channels, and an optical multiplexer 50 for recombining the channels to form the multi-channel signal. An amplitude reshaping device 42 is provided for each channel which tends to bring the amplitude of the optical pulses on the channel to a constant level.

Depending upon the gradient of the transmission characteristic obtained, it is possible to introduce a number of the devices shown in FIG. 3 in series to achieve the desired combined transmission characteristics. The regeneration unit 40 shown in FIG. 5 also includes optical amplifiers 52, for example erbium doped fibre amplifiers to overcome the attenuation provided by the NOLM. The optical regeneration unit 40 will comprise additional components to enable timing jitter control and for the control of other optical pulse characteristics. This invention is not concerned with these additional optical regeneration functions, which will not therefore be described in this text.

The invention may also be implemented as a non-linear optical loop mirror which uses an optical coupler having more than three ports. An increasing number of ports provides a greater choice as to which port will provide the output, and may enable the power transmission characteristic to be selected more accurately with the range of powers of the input pulse stream in mind. Furthermore, the invention may be implemented with any device for providing asymmetry within the optical loop mirror, providing that device results in interference of the clockwise and anticlockwise components which varies as a function of the input pulse power. Various ways of achieving this will be apparent to those skilled in the art, and some of these are discussed above.

The ports of the coupler 30 which are not used should be terminated in such a way as to avoid any interference reflection. Various additional alternatives will be apparent to those skilled in the art.

What is claimed is:

1. An apparatus for reshaping optical pulses comprising an N×N optical coupler having N ports on each side of the coupler, where N is equal to or greater than 3, wherein the apparatus comprises:

an input defined by one of the N ports on one side of the optical coupler, the input receiving an optical signal comprising optical pulses and having a maximum input power;

an output defined by another one of the N ports on said one side of the optical coupler; and a length of optical fiber connecting two of the N ports on the other side of the optical coupler, wherein the ratio of output power at the output to input power at the input has a negative gradient with respect to the input power, for all input power levels from zero to said maximum input power.

2. An apparatus as claimed in claim 1, wherein a device is provided in the length of optical fibre to introduce asymmetry.

3. An apparatus as claimed in claim 2, wherein the device comprises an optical amplifier.

4. An apparatus as claimed in claim 2, wherein the device comprises an optical attenuator.

5. An apparatus as claimed in claim 1, wherein the optical coupler comprises a 3×3 optical coupler and the ports on the one side comprise two outer ports and a middle port, and the ports on the other side comprise two outer ports and a middle port, and wherein the input port comprises one of the outer ports on the one side, the output port comprises the other of the outer ports on the one side, and the length of optical fibre connects the two outer ports on the other side of the optical coupler.

6. A multi channel optical transmission system comprising a transmitter and a receiver and at least one optical regeneration stage, the optical regeneration stage comprising an optical demultiplexer for receiving a multi channel signal and for dividing the signal into the individual channels, at least one apparatus for reshaping optical pulses as claimed in claim 1 for reshaping optical pulses on an associated channel and an optical multiplexer for recombining the channels to form the multi-channel signal.

7. A method of reshaping optical pulses comprising: selecting one port of an N×N optical coupler having N ports on each side of the coupler as an input port, where N is equal to or greater than 3, said one port being on a first side of the optical coupler and a length of optical fiber connecting two of the N ports on the other side of the optical coupler;

providing an input comprising optical pulses to be reshaped to said one port;

selecting another of said N ports on said first side of the optical coupler as an output port; and and receiving an output comprising reshaped optical pulses from said another port, wherein the input and output ports are selected such that the function of transmission versus input power has a negative gradient at the power level of the optical pulses.

8. A method as claimed in claim 7, wherein the optical coupler comprises a 3×3 optical coupler and the ports on the one side comprise two outer ports and a middle port, and the ports on the other side comprise two outer ports and a middle port, and wherein the input port comprises one of the outer ports on the one side, the output port comprises the other of the outer ports on the one side, and the length of optical fibre connects the two outer ports on the other side of the optical coupler.

* * * * *